United States Patent
Ivanov

(10) Patent No.: US 9,444,885 B2
(45) Date of Patent: Sep. 13, 2016

(54) WORKFLOW PROCESSING IN A DISTRIBUTED COMPUTING ENVIRONMENT

(71) Applicant: VMware, Inc., Palo Alto, CA (US)

(72) Inventor: Dobrin Slavov Ivanov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 274 days.

(21) Appl. No.: 14/217,498

(22) Filed: Mar. 18, 2014

(65) Prior Publication Data

US 2015/0271259 A1 Sep. 24, 2015

(51) Int. Cl.
*H04L 29/08* (2006.01)
*H04L 29/14* (2006.01)

(52) U.S. Cl.
CPC ....... *H04L 67/1008* (2013.01); *H04L 67/1004* (2013.01); *H04L 69/40* (2013.01)

(58) Field of Classification Search
CPC ........... H04L 67/1004; H04L 67/1008; H04L 69/04; G06F 11/3433
USPC .................. 709/223, 224, 226; 718/105, 104
See application file for complete search history.

(56) References Cited

U.S. PATENT DOCUMENTS

| | | | | |
|---|---|---|---|---|
| 6,338,074 | B1 * | 1/2002 | Poindexter | G06Q 10/10 709/231 |
| 7,100,147 | B2 * | 8/2006 | Miller | G06Q 10/0633 705/7.27 |
| 8,812,403 | B2 * | 8/2014 | Mercuri | G06Q 10/103 705/301 |
| 9,026,577 | B1 * | 5/2015 | Johnston | G06Q 10/0633 709/202 |
| 2003/0097485 | A1 * | 5/2003 | Horvitz | G06F 21/335 719/313 |
| 2008/0222684 | A1 * | 9/2008 | Mukraj | H04L 67/1012 725/86 |
| 2010/0186020 | A1 * | 7/2010 | Maddhirala | G06F 9/5038 718/105 |
| 2011/0131448 | A1 * | 6/2011 | Vasil | G06F 9/5038 714/19 |
| 2011/0185050 | A1 * | 7/2011 | Zeine | G06F 9/5083 709/223 |
| 2012/0089723 | A1 * | 4/2012 | Mercuri | G06F 11/3006 709/224 |
| 2012/0150751 | A1 * | 6/2012 | Pandey | G06Q 10/103 705/301 |
| 2012/0166244 | A1 * | 6/2012 | Raj | G06Q 30/016 705/7.13 |
| 2012/0284724 | A1 * | 11/2012 | Alexander | G06F 9/5027 718/102 |
| 2013/0007505 | A1 * | 1/2013 | Spear | G06F 11/2025 714/4.11 |
| 2014/0032780 | A1 * | 1/2014 | Swineford | G06F 17/30 709/233 |
| 2014/0089390 | A1 * | 3/2014 | Chandra | H04L 67/08 709/203 |
| 2014/0137187 | A1 * | 5/2014 | Kumar | H04L 63/00 726/3 |
| 2014/0279987 | A1 * | 9/2014 | Chico de Guzman Huerta | G06F 9/526 707/704 |
| 2014/0282353 | A1 * | 9/2014 | Jubran | G06F 8/00 717/101 |

* cited by examiner

Primary Examiner — Alina N Boutah

(57) ABSTRACT

An example method is provided to perform workflow processing in a distributed computing environment comprising a first node, a second node and a data store accessible by the first node and second node. The method may comprise the first node retrieving, from the data store, state information associated with a workflow being processed by the second node. The method may further comprise, in response to determination that load balancing from the second node to the first node is required based on the state information of the workflow, the first node initiating the load balancing by updating the state information of the workflow in the data store. If the state information is successfully updated, the first node may resume processing of the workflow by performing a workflow step to be completed by the second node, but otherwise, abandon the load balancing.

27 Claims, 6 Drawing Sheets

WORKFLOW PROCESSING IN A DISTRIBUTED COMPUTING ENVIRONMENT

BACKGROUND

Unless otherwise indicated herein, the approaches described in this section are not admitted to be prior art by inclusion in this section.

Distributed computing environments are increasingly utilized to support various commercial and technical applications. A distributed computing environment includes multiple nodes that are generally designed to operate independently. Nodes may be added as necessary, facilitating scalability and load sharing. Among the challenges with distributed computing environments is the handling of faulty nodes that cause defective or incomplete application processing. Nodes may fail or restart due to various reasons, such as hardware failures, software failures, network failures and other factors such as an earthquake, fire or flood, etc.

DETAILED DESCRIPTION

Figure 1:
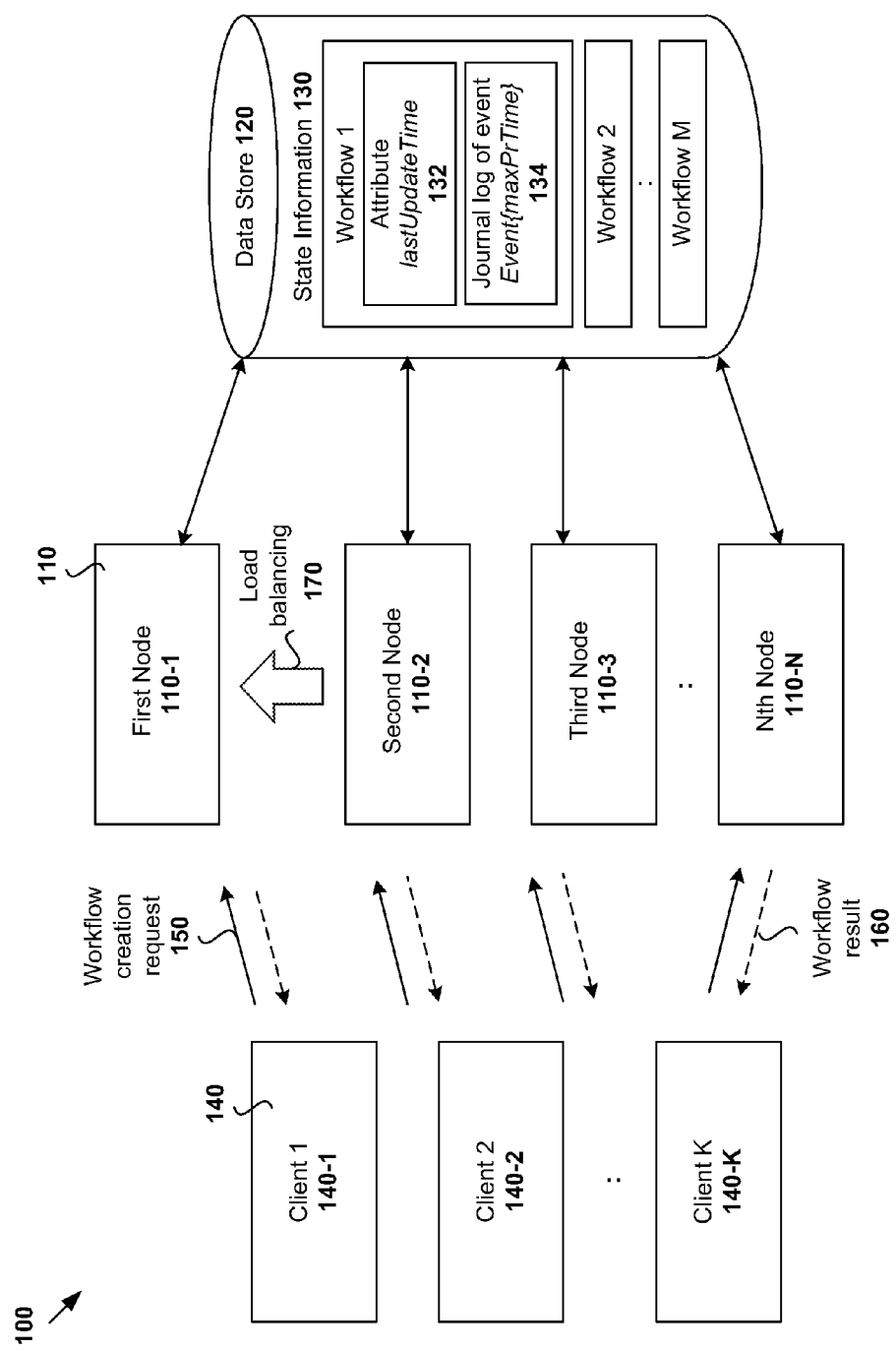
FIG. 1 is a schematic diagram illustrating an example distributed computing environment in which workflow processing may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Nodes in a distributed computing environment may be used for workflow processing. In contrast to conventional processing of a single piece of software code, a workflow may be constructed by creating a series of workflow steps and linking them together to complete, for example, a long operation, task, procedure, routine, function, etc. For example, a workflow may include three interdependent workflow steps, where workflow step 3 depends from workflow step 2, which in turn depends from workflow step 1. Workflow steps 1, 2 and 3 (in that order) may be performed separately by one or more nodes.

FIG. 1 is a schematic diagram illustrating an example distributed computing environment 100 in which workflow processing may be implemented. It should be understood that distributed computing environment 100 may include additional or alternative components, and may have a different configuration. Distributed computing environment 100 includes multiple nodes (e.g., first node 110-1, second node 110-2, third node 110-3 to Nth node 110-N etc.), which will be collectively referred to as "nodes 110" or individually as a general "node 110."

Throughout the present disclosure, a "node" may be any suitable physical or logical entity to perform workflow processing, such as a physical server, virtual machine, host etc. Nodes 110 may be implemented using any suitable technique, for example, each may run an instance of "Workflow Engine" (not shown for simplicity) to process workflows as a series of workflow steps. Although not shown, distributed computing environment 100 may include any suitable communication architecture to facilitate communication among nodes 110. Also, multiple nodes 110 may be supported by the same physical entity, or different physical entities.

To facilitate workflow processing, distributed computing environment 100 further includes shared data store 120 accessible by nodes 110. Data store 120 may employ any suitable data storage technology, such as horizontally scalable NoSQL (Not only Structured Query Language) that uses key-value (KV) data structure, etc.

Nodes 110 may be dynamically and independently added and removed in distributed computing environment 100. Multiple nodes 110 may be grouped together as a "cluster", which represents an aggregate set of resources in distributed computing environment 100. Nodes 110 may be dynamically added to or removed from a cluster, and a cluster of nodes 110 may access the same data store 120 for workflow processing and load sharing. In this case, distributed computing environment 100 is also known as a clustered environment.

Data store 120 stores state information 130 of workflows (e.g., Workflow 1, 2 to M, etc.) that are being processed by various nodes 110. Workflow processing by nodes 110 may be based on workflow creation requests 150 from clients (e.g., 140-1, 140-2, to 140-K etc.), which will be collectively referred to as "clients 140" or individually as a general "client 140." After workflow processing is completed, workflow result 160 (if any) is sent by node 110 to the requesting client 140. Instead of sending the result 160, the requesting client 140 may retrieve state information 130 of the workflow in data store 120 to ascertain whether it has been completed.

In distributed computing environment 100, there might be situations where node 110 (e.g., second node 110-2) fails to complete a workflow (e.g., Workflow 1) due to reasons such as failures and restarts, etc. In these situations, node 110 (e.g., second node 110-2) might remain in a stalled state before it recovers, thus impeding the progress of the workflow and possibly hindering that of other workflows. To complete the workflow, load balancing 170 may be performed such that workflow processing is resumed by another node 110 (e.g., first node 110-1). Effectively, as indicated by arrow 170, first node 110-1 steals the workflow from second node 110-2.

State information 130 may include any suitable information from which the requirement for load balancing 170 may be determined and processing of a workflow may be resumed. For example, state information 130 may include, without limitation, attribute 132 (e.g., lastUpdateTime) that relates to a time the workflow was last updated in data store 120, and event 134 from which an incomplete workflow step may be determined, etc.

An "event" may generally describe what has occurred in a previous workflow step and may be used to determine the next workflow step, such as to resume processing of the workflow after load balancing 170. As such, workflow processing by nodes 110 may be event-based, which involves handling one event 134 after another until there are no more events and corresponding workflow steps. Each workflow step (except the first) may be triggered by an event 134 that has not been handled or processed. For example, the next workflow step may be determined programmatically by each event 134, and handling of the event 134 causes the execution of the next workflow step.

In the example in FIG. 1, events 134 are stored in the form of a journal log, each having a processing time (e.g., maximum processing time maxPrTime) associated with the time required for a node 110 to handle the corresponding event 134 and workflow step. Different workflow steps may have different processing times. Although maxPrTime 134 is provided as an example, it will be appreciated that an expected or average processing time of the event, etc., may be recorded.

After each workflow step is completed, journal log 134 may be updated with a new event to mark its completion. A handled event may be removed from journal log 134, or simply marked as handled and not considered in subsequent steps. After handling each event, the whole workflow state may be persisted into data store 120 (e.g., as a single JSON (Java Script Object Notion) document) together with its journal log 134 where that handled event is not present anymore.

Figure 2:
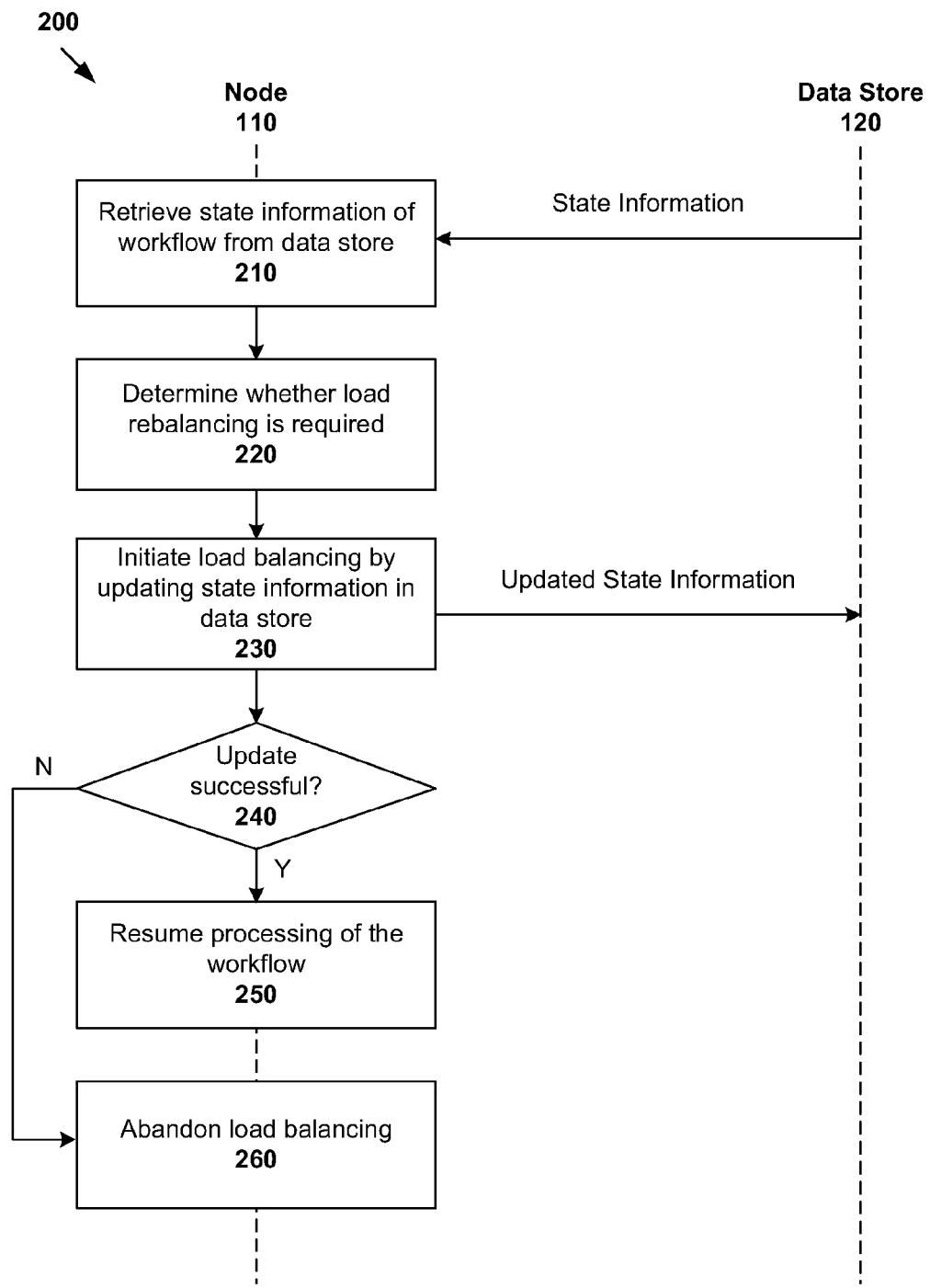
FIG. 2 is a flowchart of an example process for workflow processing in a distributed computing environment.

FIG. 2 is a flowchart of an example process 200 for workflow processing in distributed computing environment 100. Process 200 may include one or more operations, functions, or actions illustrated by one or more blocks, such as blocks 210 to 260. The various blocks may be combined into fewer blocks, divided into additional blocks, and/or eliminated based upon the desired implementation.

At block 210, first node 110-1 retrieves, from data store 120, state information 130 associated with a workflow (e.g., Workflow 1) being processed by second node 110-2. At block 220, the first node 110-1 determines whether load balancing 170 from second node 110-2 to first node 110-1 is required based on state information 130 of the workflow.

For example, the retrieved state information 130 may include attribute 132 (i.e. lastUpdateTime), event 134 associated with a workflow step to be completed by second node 110-2 and processing time (i.e. maxPrTime). Based on state information 130, first node 110-1 may determine that load balancing 170 is required if the retrieved processing time of event 134 (i.e. maxPrTime) has elapsed since state information 130 was last updated (i.e. lastUpdateTime).

At block 230, in response to determination that load balancing 170 is required, the first node 110-1 initiates the load balancing 170 by updating state information 130 of the workflow in data store 120. For example, load balancing 170 may be initiated by first node 110-1 updating attribute 132 (i.e. lastUpdateTime).

At blocks 240 and 250, if state information 130 is successfully updated, first node 110-1 resumes processing of the workflow and performs a workflow step to be completed by the second node 110-2 based on state information 130. Otherwise, at block 260, first node 110-1 abandons the load balancing 170.

Example process 200 provides resilience to failures and restarts of nodes 110 in distributed computing environment 100. State information 130 of the workflow being processed by second node 110-2 is stored in data store 120 and accessible by first node 110-1 for load balancing 170. When it is determined that load balancing 170 is required (e.g., due to failure or restart of the second node 110-2, etc.), first node 110-1 initiates load balancing 170 to resume processing of the workflow.

According to example process 200, state information 130 of the workflow may be updated and persistently stored in data store 120 by second node 110-2 after each workflow step is completed. This allows first node 110-1 to determine what workflow step is to be completed such that it can take over without having to repeat any previous workflow steps. Any suitable technique may be used to update state information 130, such as via an Application Programming Interface (API) provided by data store 120, etc.

According to example process 200, since workflow steps may be performed more than once due to load balancing 170 (e.g., initially by second node 110-2, followed by first node 110-1) according to example process 200, workflow steps may be designed as idempotent steps such that they may be safely repeated. The term "idempotent" may generally refer to the steps producing the same effect and result in the same state information whether they are invoked once or many times. Idempotent steps may be performed using any suitable technique, such as, if there are multiple operations inside a single workflow step, some operations may be determined (e.g., programmatically) as not necessary.

Example process 200 may also reduce the likelihood of, if not prevent, multiple nodes 110 in distributed computing environment 100 processing the same workflow. In particular, first node 110-1 resumes processing of the workflow after successfully updating its state information 130 in data store 120. Otherwise, if first node 110-1 fails to update state information 130 (e.g., due to load balancing by a third node 110-3 before the attempt by first node 110-1, etc.), first node 110-1 will abandon load balancing 170. Therefore, this reduces the likelihood of, if not prevents, conflicts between multiple nodes attempting to steal the same workflow.

Since nodes 110 in distributed computing environment 100 may independently determine whether load balancing 170 is required and resume processing of workflows based on state information 130 in shared data store 120, scalability is supported in distributed computing environment 100. Example process 200 should be contrasted with a centralized approach, which requires a central controller to monitor workflows being processed by various nodes and direct load balancing using a messaging system.

The centralized approach has a number of disadvantages. The central controller usually requires current knowledge of all nodes 110 to make load balancing decisions, which necessitates communication links from each node 110 to the central controller. The centralized approach often has poor scalability, due to rapid increase of overheads as the number of nodes 110 increases. Also, failure of the central controller will lead to defective load balancing. By contrast, load balancing decisions are decentralized to nodes 110 according to example process 200. Further, since load balancing is abandoned by each node 110 when update of the state information fails, a locking service (e.g., cluster-wide) to manage conflicts between nodes 110 is not required.

Workflows processing may be implemented using any suitable technique, such as object-oriented programming, etc. For example, journal log 134 may be implemented as an object with a class that inherits a common base class defining maxPrTime as an attribute. Attribute lastUpdateTime 132 may be part of an abstract base workflow class so that the Workflow Engine instance of each node 110 may process different workflows in a similar way. All concrete workflows extend the base workflow class and inherit attribute lastUpdateTime 132. Event 134 may be implemented as a class that programmatically specifies the associated next workflow step.

Examples of workflow processing by second node 110-2 and first node 110-1 will now be explained in more detail with reference to FIG. 3 and FIG. 4 respectively.

Workflow Processing

Figure 3:
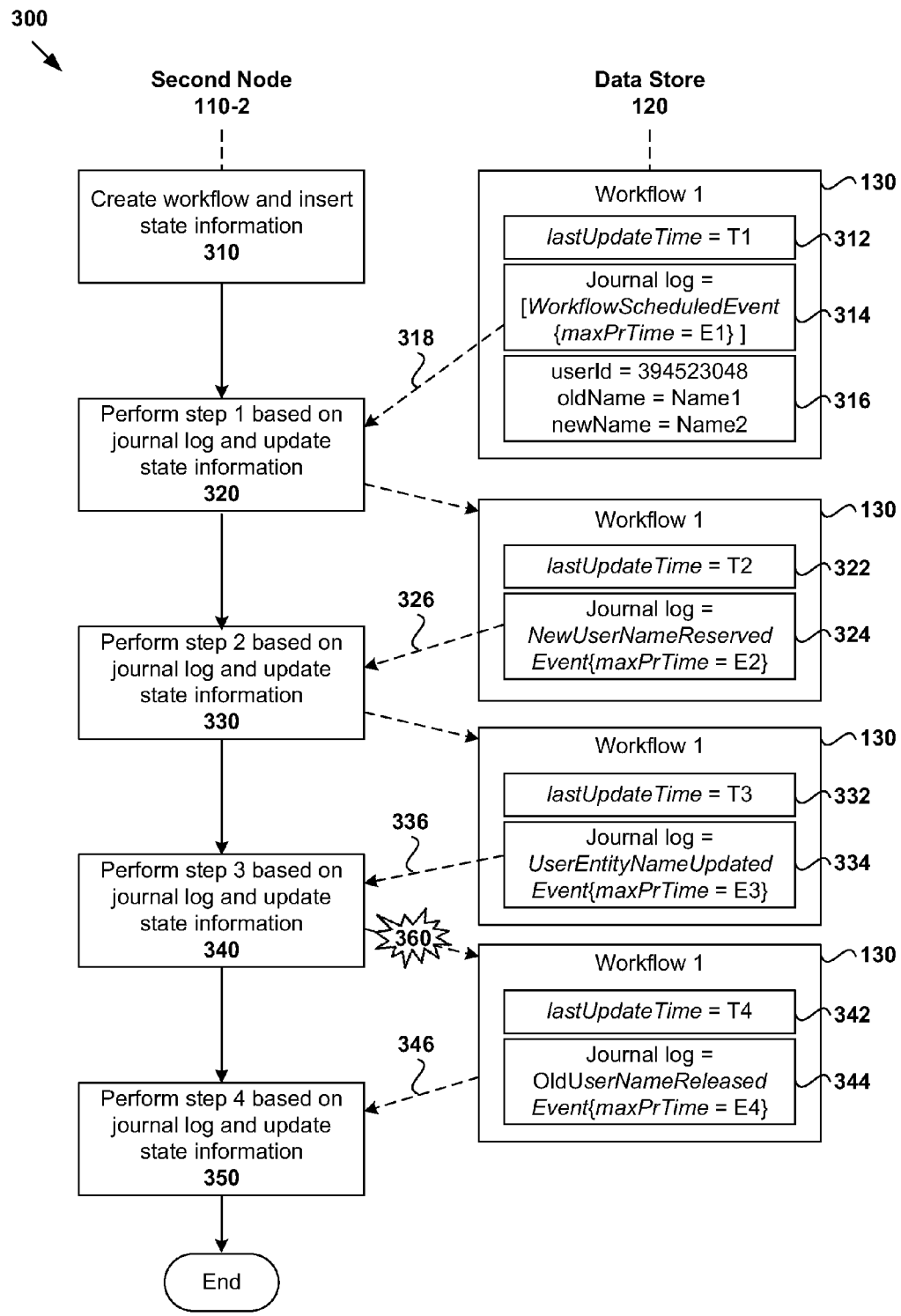
FIG. 3 is a flowchart of an example process for workflow processing by a second node in the example distributed computing environment in FIG. 2.

FIG. 3 shows a flowchart of an example process 300 for workflow processing by second node 110-2 in the example in FIG. 2. Process 300 may include one or more operations, functions, or actions illustrated by one or more blocks, such as blocks 310 to 350. The various blocks may be combined into fewer blocks, divided into additional blocks, and/or eliminated based upon the desired implementation.

In the example in FIG. 3, second node 110-2 is processing a ChangeUserName workflow to change the name of a user with userId=394523048 from oldName=Name1 to newName=Name2. Any other suitable workflow with or without input parameters may be processed in a similar manner.

At block 310 in FIG. 3, second node 110-2 creates a new workflow with input parameters userId=394523048, oldName=Name1 and newName=Name2, and inserts its state information 130 accordingly. In particular, second node 110-2 inserts attribute lastUpdateTime=T1 (see 312), logs the initial event WorkflowScheduledEvent in journal log (see 314) and stores the received input parameters as user-defined information (see 316). The maximum processing time maxPrTime of the initial event is set as E1. For example, the initial state information 130 may be prepared in the RAM (random access memory) of second node 110-2 and then inserted by second node 110-2 into data store 120. In practice, state information 130 may be inserted, subsequently and updated, as a whole (e.g., as a single JSON document). As indicated at 318, the first workflow step, i.e. step 1, is associated with event WorkflowScheduledEvent in journal log (see 314).

At block 320 in FIG. 3, second node 110-2 performs step 1 of the ChangeUserName workflow and updates its state information 130 accordingly. In the example in FIG. 3, second node 110-2 handles the top event logged at block 310 in journal log, i.e. WorkflowScheduledEvent (see 314). The event triggers step 1 that reserves newName=Name2 against a Name Reservation System.

After successfully completing step 1, second node 110-2 updates state information 130 of the Workflow 1 in data store 120. In particular, second node 110-2 updates attribute lastUpdateTime=T2 (see 322) and logs new event NewUserNameReservedEvent (see 324) with maxPrTime=E2. User-defined information (see 316) remains unchanged and not shown for simplicity in subsequent steps. Since WorkflowScheduledEvent (see 314) is handled, second node 110-2 also removes it from data store 120. As indicated at 326, new event NewUserNameReservedEvent (see 324) is associated with the next workflow step, i.e. step 2.

At block 330 in FIG. 3, second node 110-2 performs step 2 of the ChangeUserName workflow and updates its state information 130 accordingly. In the example in FIG. 3, handling of the top event logged at block 320 in journal log, i.e. NewUserNameReservedEvent (see 324), triggers step 2 that updates a User Entity denoted by user-defined state userId=394523048. After successfully completing step 2, second node 110-2 updates lastUpdateTime=T3 (see 332) and logs new event UserEntityNameUpdatedEvent (see 334) with maxPrTime=E3. The previous event (see 324) is removed from data store 120. As indicated at 336, new event UserEntityNameUpdatedEvent (see 334) is associated with the next workflow step, i.e. step 3.

At block 340 in FIG. 3, workflow processing continues with second node 110-2 performing step 3 and updates state information 130 of the workflow accordingly. In particular, handling of UserEntityNameUpdatedEvent (see 334) triggers step 3 that releases oldName=Name1 against the Name Reservation System previously accessed at block 320.

After successfully executing step 3, second node 110-2 persists new state information 130 that includes attribute lastUpdateTime=T4 (see 342) and new event OldUserNameReleasedEvent (see 344) in data store 120. Event UserEntityNameUpdatedEvent (see 334) is removed from data store 120. As indicated at 346, new event OldUserNameReleasedEvent (see 344) is associated with the next workflow step, i.e. step 4.

Similarly, at block 350 in FIG. 3, second node 110-2 performs step 4 and updates state information 130 of the workflow accordingly. Since step 4 is the last step in the workflow, handling of the top event in journal log, OldUserNameReleasedEvent (see 344), results in a dummy step and no new event is logged. Second node 110-2 updates state information 130 by deleting it from data store 120 because ChangeUserName workflow is successfully completed.

Blocks 310 to 350 in FIG. 3 may be summarized using the pseudo-code in Table 1. After a pending workflow is obtained (see line 1), an event-based workflow processing is performed, where the workflow is processed as a series of steps (see line 2) by handling one event after another (see line 3) and updating state information 130 in data store 120 after performing each corresponding workflow step (see line 4).

TABLE 1

| Pseudo-code of Workflow Processing |
|---|
| 1  workflow = workflowRepository.getNextPendingWorkflow( ); |
| 2  while (workflow.hasPendingEvents( )) { |
| 3    workflow.handleNextEvent( ); |
| 4    workflowRepository.updateWorkflow(workflow); |
| 5  } |

Load Balancing

According to blocks 310 to 340 in FIG. 3, second node 110-2 persistently stores state information 130 of Workflow 1 in data store 120 after successfully completing each step. If second node 110-2 fails to complete a particular step, another node such as first node 110-1 may resume processing of Workflow 1 based on persisted state information 130 without having to repeat any of the previous completed steps.

For example, at 360 in FIG. 3, consider the situation where second node 110-2 fails to complete step 3 associated with event UserEntityNameUpdatedEvent (see 334) and does not update attribute lastUpdateTime 332 and journal log 334. In this case, first node 110-1 may initiate load balancing 170 from second node 110-2 to itself and resume processing of Workflow 1.

Figure 4:
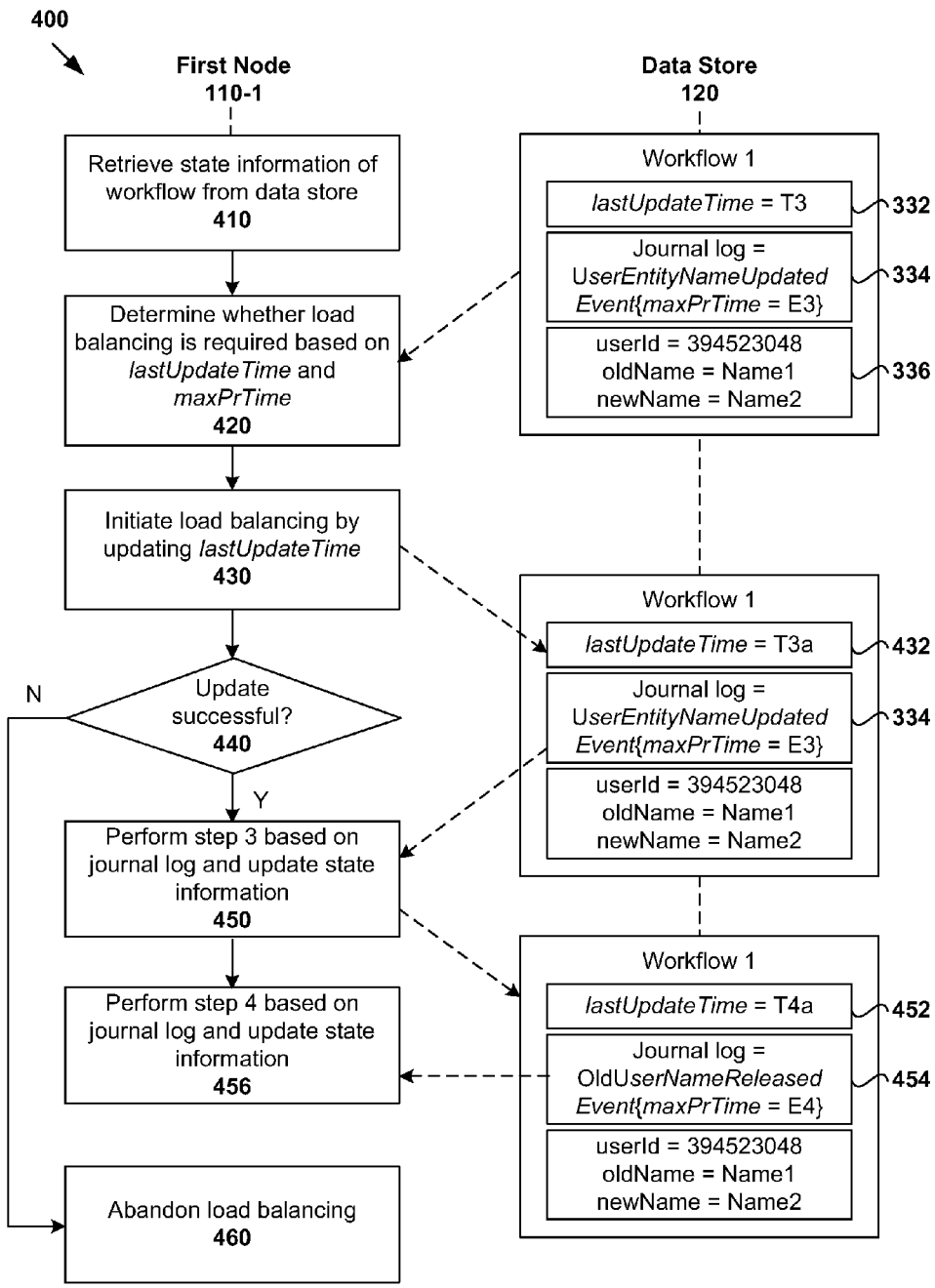
FIG. 4 is a flowchart of an example process for workflow processing by a first node in the example distributed computing environment in FIG. 2.

FIG. 4 is a flowchart of an example process 400 for workflow processing by first node 110-1 in the example in FIG. 1. Process 400 may include one or more operations, functions, or actions illustrated by one or more blocks, such as blocks 410 to 460. The various blocks may be combined into fewer blocks, divided into additional blocks, and/or eliminated based upon the desired implementation.

At block 410 in FIG. 4 (related to 210 in FIG. 2), first node 110-1 retrieves state information 130 of Workflow 1 from data store 120. For example, first node 110-1 may implement a "Workflow Monitor" component (not shown for simplicity) that scans data store 120, such as once at start-up and then periodically at regular intervals. A snapshot of Workflow 1 may be retrieved, including state information 130 of Workflow 1 that is updated by second node 110-2 at block 330 in FIG. 3.

At block 420 in FIG. 4 (related to 220 in FIG. 2), first node 110-1 determines whether load balancing 170 is required, such as whether second node 110-2 is taking too long to complete step 3 associated with event UserEntity-NameUpdatedEvent (see 334). The "Workflow Monitor" component of first node 110-1 may include an isEligible-ForRebalance( ) routine that is invoked to determine if maxPrTime=E3 (see 334) has elapsed since lastUpdateTime=T3 (see 332). If yes, first node 110-1 determines that load balancing 170 is required to resume processing of Workflow 1, effectively "stealing" it from second node 110-2.

First node 110-1 may retrieve state information 130 of Workflow 1 (i.e. block 410) and determine whether load balancing is required 170 (i.e. block 420) after determining that it has the capacity to perform additional workflow processing, i.e. to resume processing of Workflow 1. For example, nodes 110 may use multi-thread programming to execute 100 threads simultaneously. A "ThreadPoolExecutor" component each node 110 maintains a bounded queue of 1000 workflows, which means that 100 workflow steps from 1000 workflows may be performed concurrently. If the queue is at or near full capacity, first node 110-1 may decide not to take on Workflow 1. Further, if first node 110-1 does not have any more capacity, its "Workflow Monitor" component may pause scanning using isEligibleForRebalance( ) for a period of time and resume scanning when it has capacity.

At block 430 in FIG. 4 (related to 230 in FIG. 2), first node 110-1 initiates load balancing 170 by updating state information 130 of Workflow 1. In this example, first node 110-1 updates attribute lastUpdateTime from T3 (see 332) to T3a (see 432).

At blocks 440 and 450 in FIG. 4 (related to 240 and 250 in FIG. 2), if lastUpdateTime=T3 (see 332) is successfully updated to T3a, first node 110-1 resumes processing of Workflow 1 by performing a step to be completed by second node 110-2. For example, handling of UserEntityNameUpdatedEvent (see 334) triggers step 3, which releases oldName=Name1 against a Name Reservation System.

After completing step 3, first node 110-2 persists new state information 130 that includes attribute lastUpdateTime=T4a (see 452) and new event OldUserNameReleasedEvent (see 454) in data store 120. The previous event, UserEntityNameUpdatedEvent (see 334), is removed from data store 120.

Block 456 in FIG. 4 is similar to block 350 in FIG. 3. First node 110-1 performs final step 4 triggered by OldUserNameReleasedEvent (see 454), which results in a dummy step and no new event is logged. Since all steps have been completed, state information 130 of Workflow 1 is deleted from data store 120.

At blocks 440 and 460 in FIG. 4 (related to 240 and 260 in FIG. 2), since attribute lastUpdateTime=T3 (see 332) is not successfully updated from T3 to T3a, first node 110-1 abandons load balancing 170.

Abandonment

As will be described with reference to FIG. 5, the purpose of the abandonment is to reduce the likelihood of, or prevent, a conflict caused by multiple nodes 110 processing the same workflow.

Figure 5:
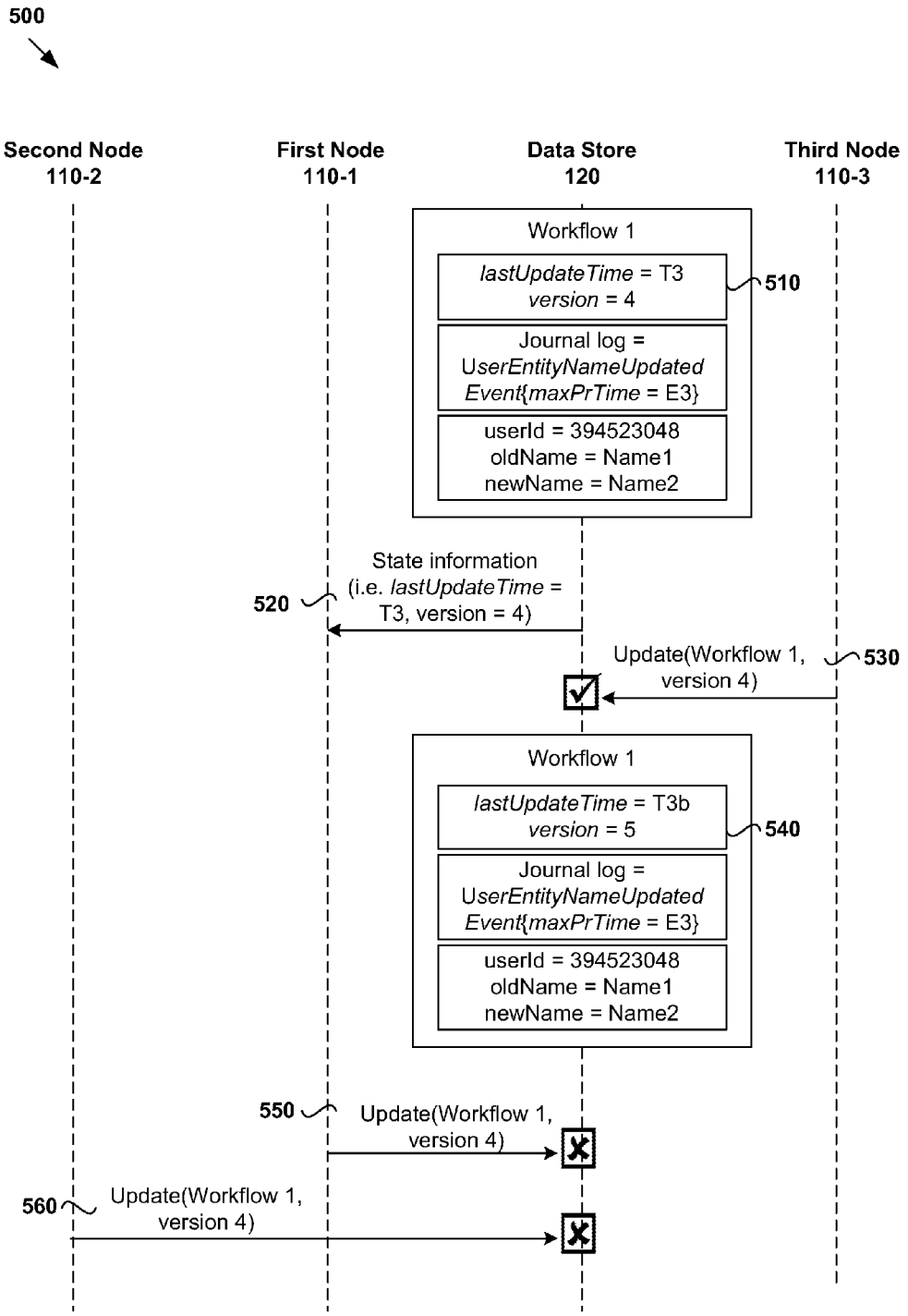
FIG. 5 is a schematic diagram illustrating a first node, a second node and a third node in the example distributed computing environment in FIG. 1 updating state information of a workflow.

FIG. 5 is a schematic diagram illustrating first node 110-1, second node 110-2 and third node 110-3 updating state information 130 (e.g., lastUpdateTime) of a workflow (e.g., Workflow 1) in distributed computing environment 100 in FIG. 1. Second node 110-2 was originally processing the workflow according to example 300 in FIG. 3, while first node 110-1 and third node 110-3 attempt to steal the workflow from second node 110-2.

In the example in FIG. 5, third node 110-3 successfully performs load balancing and resumes processing of Workflow 1. To reduce the likelihood, if not avoid, first node 110-1 stealing the same Workflow 1, an optimistic locking approach may be used. This means first node 110-1 is not permitted to update state information 130 if third node 110-3 updated the same state information 130 after it was last retrieved by first node 110-1. This "in-between" update causes the first node 110-1 to abandon its load balancing attempt.

As will be explained with reference to FIG. 5 and Table 2 below, the optimistic locking approach may be based on version numbers. Compared to corresponding Table 1, when retrieving state information 130 of pending Workflow 1 (see line 1), its version number (e.g., version 4) is also obtained. If state information 130 is successfully updated (see line 4), data store 120 returns an updated version number (e.g., version 5). Otherwise (i.e. update has failed), a programmatic exception, such as an optimistic locking exception or "OptimisticLockingException" is experienced by the requesting node (e.g., first node 110-1).

TABLE 2

Pseudo-code of Optimistic Locking Exception during Workflow Processing

| | |
|---|---|
| 1 | (workflow, workflow version) = workflowRepository.getNextPendingWorkflow( ); |
| 2 | while (workflow.hasPendingEvents( )) { |
| 3 | workflow.handleNextEvent( ); |
| 4 | workflow version = workflowRepository.updateWorkflow(workflow, workflow version); |
| 5 | } |

Version numbers before and after an update are indicated at 510 (e.g., version 4) and 540 (e.g., version 5) in FIG. 5, respectively. Although version numbers 510 and 540 are shown to be part of state information 130 in FIG. 5 as an example and for easy reference, it should be understood that it is not mandatory for data store 120 to store versioning information of a workflow (e.g., as part of an entity, row or record associated with the workflow). The versioning information may simply be internally managed by data store 120 and supplied by an API of data store 120 to nodes 110.

At 530 in FIG. 5, after first node 110-1 retrieves state information 130 (see 520), third node 110-3 updates version 4 of state information of Workflow 1 successfully. This updates attribute lastUpdateTime from T3 to T3b and increases the version number to version 5 (see 540).

Due to this in-between update by third node 110-3, when first node 110-1 attempts to update version 4 of state information of Workflow 1 at 550 in FIG. 5, the update will not be successful because the version number is now version 5. As such, when Workflow 1 is stolen by third node 110-3, it cannot be immediately stolen again by a different node, i.e. first node 110-1 in this example.

Since the update at 550 in FIG. 5 is not successful, first node 110-1 also experiences OptimisticLockingException". First node 110-1 then abandons the load balancing and leaves state information 130 of Workflow 1 unchanged.

Referring to Table 2 again, OptimisticLockingException may be thrown after first node 110-1 attempts to update attribute lastUpdateTime using workflowRepository.updateWorkflow (Workflow 1, version 4) at line 5. In general, optimistic locking may be used for low contended resources such as in the present workflow processing application.

At 560 in FIG. 5, if second node 110-2 tries to update attribute lastUpdateTime (e.g., after recovering from a failure) of version 4, it may also experience exception OptimisticLockingException since the most recent version number is version 5. Also, if and when second node 110-2 refreshes state information 130 of Workflow 1, it will learn that attribute lastUpdateTime and corresponding version number have been updated, i.e. an indication that Workflow 1 has been stolen and load balancing has occurred.

Although not shown in FIG. 1 to FIG. 5, state information 130 of a workflow may further include an additional attribute that identifies node 110 that successfully updates state information 130 (i.e. lastUpdateNodeIdentifier). Similarly, if and when second node 110-2 refreshes state information 130 of Workflow 1 after experiencing OptimisticLockingException, the additional attribute may be used as an indication to second node 110-2 as to which node 110 has stolen Workflow 1.

Computer System

Figure 6:
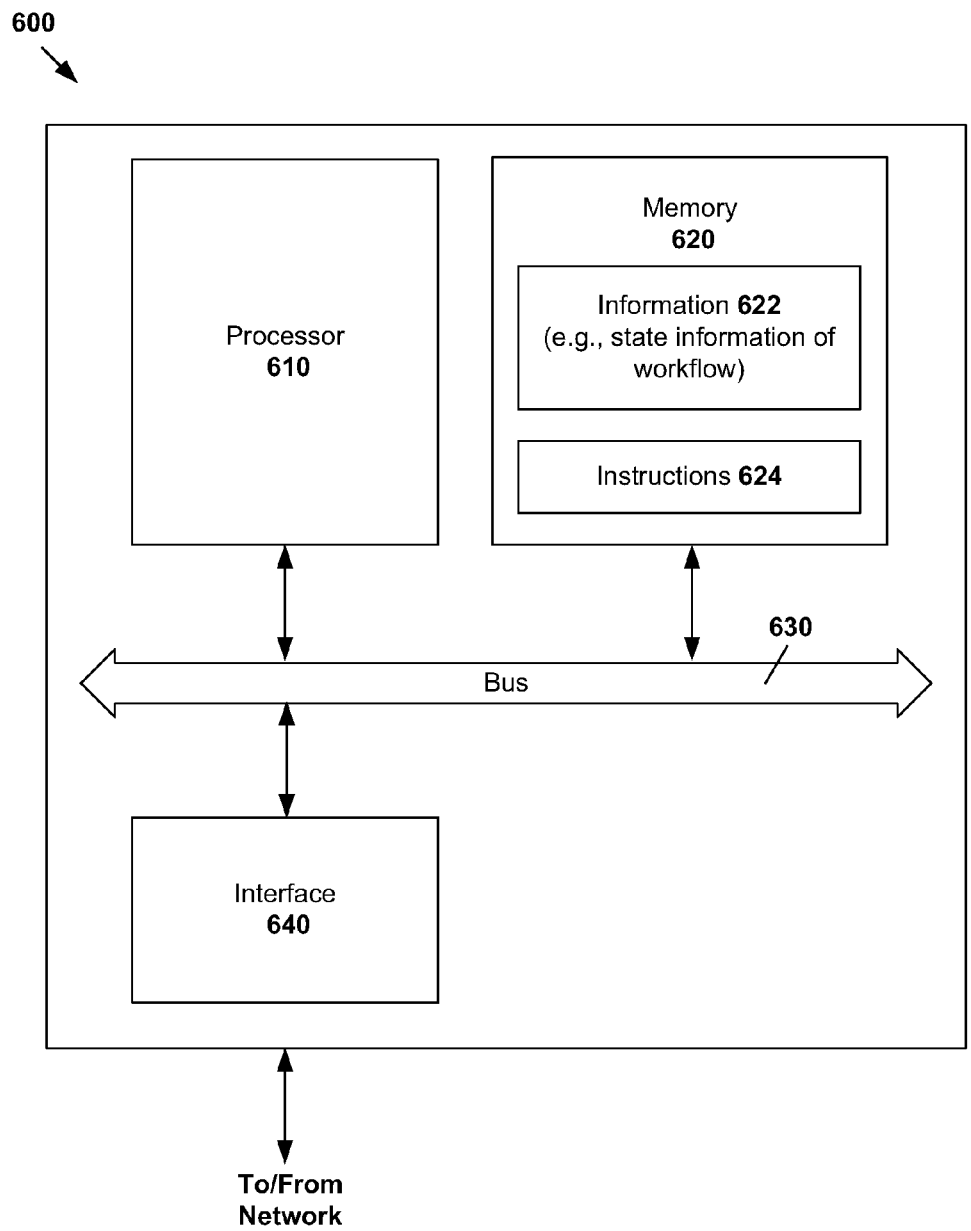
FIG. 6 is a schematic diagram illustrating a computer system for workflow processing in the example distributed computing environment in FIG. 1.

The above examples can be implemented by hardware, software or firmware or a combination thereof. FIG. 6 is a schematic diagram of an example computer system 600 for workflow processing in distributed computing environment 100. Example computer system 600 is capable of acting as first node 110-1 and second node 110-2 described herein.

Example computer system 600 may include processor 610, memory 620, network interface device 640, and bus 630 that facilitates communication among these illustrated components and other components. Processor 610 is to perform processes described herein with reference to FIG. 1 to FIG. 5. Memory 620 may store relevant information 622 to perform workflow processing in distributed computing environment 100, such as state information of workflows etc. Memory 620 may further store machine-readable instructions 624 executable by processor 610 to cause processor 610 to perform processes described herein with reference to FIG. 1 to FIG. 5.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method for a computer system to perform workflow processing in a distributed computing environment comprising the computer system as a first node, a second node and a data store accessible by the first node and second node, the method comprising:
   the first node retrieving, from the data store, state information associated with a workflow being processed by the second node;
   the first node determining whether load balancing from the second node to the first node is required; and
   in response to determination that load balancing from the second node to the first node is required based on the state information of the workflow,
      the first node initiating the load balancing to take over the workflow from the second node by updating the state information of the workflow in the data store; and
      if the workflow is taken over based on a successful update of the state information, the first node resuming processing of the workflow by performing a workflow step to be completed by the second node, but otherwise, if the workflow is not taken over based on an unsuccessful update of the state information, the first node abandoning the load balancing.

2. The method of claim 1, wherein the state information of the workflow comprises an attribute associated with a time the state information was last updated by the second node, and initiating the load balancing comprises the first node updating the attribute in the data store.

3. The method of claim 1, wherein the state information of the workflow comprises an event associated with the workflow step to be completed by the second node and a processing time of the event.

4. The method of claim 3, wherein determination that load balancing is required comprises the first node determining that the processing time of the event has elapsed since the state information was last updated by the second node.

5. The method of claim 3, wherein resuming processing of the workflow comprises:
   the first node handling the event to perform the workflow step to be completed; and
   the first node storing a new event associated with a new workflow step in data store.

6. The method of claim 3, wherein the processing time is a maximum or expected processing time to handle the event and perform the workflow step associated with the event.

7. The method of claim 1, wherein the state information of the workflow is retrieved after determining that the first node has capacity to perform additional workflow processing.

8. The method of claim 1, wherein abandoning the load balancing further comprises: the first node determining that the update is not successful based on an optimistic locking exception caused by:
   after the first node retrieves the state information but before the first node updates the state information, the state information is updated by the second node or a third node.

9. The method of claim 1, wherein the workflow comprises multiple idempotent workflow steps including the workflow step to be completed by the second node, and state information of the workflow in the data store is updated after the completion of each workflow step.

10. A non-transitory computer-readable storage medium that includes a set of instructions which, in response to execution by a processor of a computer system, causes the processor to perform workflow processing in a distributed computing environment comprising the computer system as a first node, a second node and a data store accessible by the first node and second node, comprising:
   the first node retrieving, from the data store, state information associated with a workflow being processed by the second node;
   the first node determining whether load balancing from the second node to the first node is required; and
   in response to determination that load balancing from the second node to the first node is required based on the state information of the workflow,
      the first node initiating the load balancing to take over the workflow from the second node by updating the state information of the workflow in the data store; and
      if the workflow is taken over based on a successful update of the state information, the first node resuming processing of the workflow by performing a workflow step to be completed by the second node, but otherwise, if the workflow is not taken over based on an unsuccessful update of the state information, the first node abandoning the load balancing.

11. The non-transitory computer-readable storage medium of claim 10, wherein the state information of the workflow comprises an attribute associated with a time the state information was last updated by the second node, and initiating the load balancing comprises the first node updating the attribute in the data store.

12. The non-transitory computer-readable storage medium of claim 10, wherein the state information of the workflow comprises an event associated with the workflow step to be completed by the second node and a processing time of the event.

13. The non-transitory computer-readable storage medium of claim 12, wherein the determination that load balancing is required further comprises: the first node determining that the processing time of the event has elapsed since the state information was last updated by the second node.

14. The non-transitory computer-readable storage medium of claim 12, wherein resuming processing of the workflow comprises handling the event to perform the workflow step to be completed by the second node and storing a new event associated with a new workflow step in data store.

15. The non-transitory computer-readable storage medium of claim 12, wherein the processing time is a maximum or expected processing time to handle the event and perform the workflow step associated with the event.

16. The non-transitory computer-readable storage medium of claim 10, wherein state information of the workflow is retrieved after determining that the first node has capacity to perform additional workflow processing.

17. The non-transitory computer-readable storage medium of claim 10, wherein abandoning the load balancing further comprises:
   in response to an optimistic locking programmatic exception caused by the update of the state information, the first node determining that the update is not successful,
   wherein the optimistic locking programmatic exception is caused by: after the first node retrieves the state information but before the first node updates the state information, the state information is updated by the second node or a third node.

18. The non-transitory computer-readable storage medium of claim 10, wherein the workflow comprises multiple idempotent workflow steps including the workflow step to be completed by the second node, and state information of the workflow in the data store is updated after the completion of each workflow step.

19. A computer system for workflow processing in a distributed computing environment that comprises the computer system as a first node, a second node and a data store accessible by the first node and the second node, wherein the computer system comprises:
   a processor; and
   a non-transitory computer readable medium having stored thereon instructions that, when executed by the processor, causes the processor to:
   retrieve, from the data store, state information associated with a workflow being processed by the second node;
   determine whether load balancing from the second node to the first node is required; and
   in response to determination that load balancing is required based on the state information of the workflow,
      initiate the load balancing to take over the workflow from the second node by updating the state information of the workflow in the data store; and
      if the workflow is taken over based on a successful update of the state information, resume processing of the workflow by performing a workflow step to be completed by the second node, but otherwise, if the workflow is not taken over based on an unsuccessful update of the state information, abandon the load balancing.

20. The computer system of claim 19, wherein the state information of the workflow comprises an attribute associated with a time the state information was last updated by the second node, and instructions for initiating the load balancing cause the processor to update the attribute in the data store.

21. The computer system of claim 19, wherein the state information of the workflow comprises an event associated with the workflow step to be completed by the second node and a processing time of the event.

22. The computer system of claim 21, wherein the non-transitory computer readable medium having stored thereon instructions for the determination that load balancing is required comprises additional instructions, when executed by the processor, causes the processor to determine that the processing time of the event has elapsed since the state information was last updated by the second node.

23. The computer system of claim 21, wherein the non-transitory computer readable medium having stored thereon instructions for resuming processing of the workflow, when executed by the processor, causes the processor to handle the event to perform the workflow step to be completed by the second node and storing a new event associated with a new workflow step in data store.

24. The computer system of claim 21, wherein the processing time is a maximum or expected processing time to handle the event and perform the workflow step associated with the event.

25. The computer system of claim 19, wherein the non-transitory computer readable medium having stored thereon instructions for retrieving the state information of the workflow comprises additional instructions, when executed by the processor, causes the processor to retrieve the state information after determining that the first node has capacity to perform additional workflow processing.

26. The computer system of claim 19, wherein the non-transitory computer readable medium having stored thereon instructions for abandoning the load balancing comprises additional instructions, when executed by the processor, causes the processor to:
  in response to an optimistic locking programmatic exception caused by the update of the state information, determine that the update is not successful,
  wherein the optimistic locking programmatic exception is caused by: after the first node retrieves the state information but before the first node updates the state information, the state information is updated by the second node or a third node.

27. The computer system of claim 19, wherein the workflow comprises multiple idempotent workflow steps including the workflow step to be completed by the second node, and state information of the workflow in the data store is updated after the completion of each workflow step.

\* \* \* \* \*